United States Patent
Yu et al.

(10) Patent No.: US 8,514,959 B2
(45) Date of Patent: Aug. 20, 2013

(54) MIMO TRANSMITTING APPARATUS, AND DATA RETRANSMITTING METHOD IN MIMO SYSTEM

(75) Inventors: Xiaohong Yu, Beijing (CN); Jifeng Li, Kanagawa (JP)

(73) Assignee: Panasonic Corporation, Osaka (JP)

(*) Notice: Subject to any disclaimer, the term of this patent is extended or adjusted under 35 U.S.C. 154(b) by 703 days.

(21) Appl. No.: 11/908,081

(22) PCT Filed: Mar. 10, 2006

(86) PCT No.: PCT/JP2006/304809
§ 371 (c)(1),
(2), (4) Date: Sep. 7, 2007

(87) PCT Pub. No.: WO2006/095877
PCT Pub. Date: Sep. 14, 2006

(65) Prior Publication Data
US 2009/0028259 A1    Jan. 29, 2009

(30) Foreign Application Priority Data
Mar. 11, 2005    (CN) .......................... 2005 1 0054762

(51) Int. Cl.
*H04B 7/02* (2006.01)
(52) U.S. Cl.
USPC ........................... 375/267; 375/295; 375/316
(58) Field of Classification Search
USPC .................. 375/260, 267, 295, 316
See application file for complete search history.

(56) References Cited

U.S. PATENT DOCUMENTS

| 7,016,658 | B2 * | 3/2006 | Kim et al. ...................... 455/102 |
| 7,093,178 | B2 | 8/2006 | Kim et al. |
| 7,180,967 | B2 | 2/2007 | Hoshino et al. |
| 2002/0176362 | A1 * | 11/2002 | Yun et al. ....................... 370/236 |
| 2002/0199147 | A1 * | 12/2002 | Kim et al. ....................... 714/748 |
| 2003/0007476 | A1 * | 1/2003 | Kim et al. ....................... 370/342 |
| 2003/0039229 | A1 * | 2/2003 | Ostman ......................... 370/335 |

(Continued)

FOREIGN PATENT DOCUMENTS

| CN | 1 392 694 | 1/2003 |
| CN | 1 433 183 | 7/2003 |

(Continued)

OTHER PUBLICATIONS

M. Uesugi, et al.; "Dai 4 Sedai Ido Tsushin eno Tachi Hencho no Donyu ni T suite," 2001 Nen the Institute of Electronics, Information and Communication Engineers Sogo Taikai Koen Ronbunshu, Communications 1, Mar. 7, 2001, p. 785.

(Continued)

*Primary Examiner* — Chieh M Fan
*Assistant Examiner* — Freshteh N Aghdam
(74) *Attorney, Agent, or Firm* — Dickinson Wright PLLC

(57) ABSTRACT

MIMO transmitting apparatus wherein data to be retransmitted and data to be transmitted anew are rearranged, thereby using HARQ technique to improve the reliability of the system transmission, while increasing the system throughput and improving the efficiency of the whole data transmission. In this apparatus, a retransmittal data selecting means (400) temporarily stores data, and outputs, as retransmittal data, the data when it is determined, based on feedback information, that the data must be retransmitted. A deinterleaving means (404) performs a deinterleaving process under control of an interleaving control means (408). The interleaving control means (408) controls, based on the feedback information, an interleaving process.

7 Claims, 5 Drawing Sheets

(56) References Cited

U.S. PATENT DOCUMENTS

| 2004/0062221 A1* | 4/2004 | Gopalakrishnan et al. ... 370/335 |
| 2004/0148552 A1 | 7/2004 | Matsumoto |
| 2004/0184398 A1 | 9/2004 | Walton |
| 2004/0199846 A1 | 10/2004 | Matsumoto et al. |
| 2004/0219883 A1 | 11/2004 | Pauli |
| 2005/0235190 A1* | 10/2005 | Miyazaki et al. ............. 714/748 |
| 2010/0120433 A1* | 5/2010 | Grilli et al. .................... 455/436 |

FOREIGN PATENT DOCUMENTS

| CN | 1490972 | 4/2004 |
| JP | 2004 40232 | 2/2004 |
| JP | 2004 112471 | 4/2004 |
| JP | 2004 135304 | 4/2004 |
| JP | 2004 297182 | 10/2004 |
| WO | 03/041300 | 5/2003 |

OTHER PUBLICATIONS

H. Zheng, et al., "Multiple ARQ Processes for MIMO Systems," Eurasip Journal on Applied Signal Processing, May 2004, pp. 772-782.

Supplementary European Search Report dated Mar. 6, 2012.

* cited by examiner

MIMO TRANSMITTING APPARATUS, AND DATA RETRANSMITTING METHOD IN MIMO SYSTEM

TECHNICAL FIELD

The present invention relates to a MIMO transmitting apparatus and a data retransmission method for a MIMO system, and particularly to a multi-antenna transmission technique for a mobile communication system. More specifically, the present invention relates to a MIMO transmitting apparatus that performs data retransmission in a multi-antenna system and a data retransmission method for a MIMO system.

BACKGROUND ART

At present, in mobile communication, a number of new techniques and applications such as OFDM and MIMO are developed with the development of theory and technique. These techniques significantly improve the performance of mobile communication systems and respond to requirements for radio multimedia and high-speed data transmission. Multiple-Input Multiple-Output (MIMO) technique is a significant achievement in intelligent antenna technique in a radio mobile communication field. The MIMO technique indicates the use of a plurality of antennas for both data transmission and data reception. As a result of studies, by using the MIMO technique, it is possible to increase the channel capacity, improve channel reliability and reduce a bit error rate. The maximum capacity or upper limit of the capacity of a MIMO system linearly increases in accordance with the increase in the minimum number of antennas. Under the same condition, when a normal intelligent antenna such as a multi-antenna and antenna array is used on a receiving side or transmitting side, the capacity increases according to the increase in the logarithm of the number of antennas. On the other hand, the MIMO technique has an extremely high potential for an increase in the capacity of a radio communication system and is thereby a key technology used in new generation mobile communication.

Data traffic requirements resulting from the development of communication have increased day by day and methods for supporting high-speed data traffic have been also proposed one after another. In the methods, higher order modulation techniques such as 8PSK and 16QAM are commonly used. Although the higher order modulation techniques improve a system data transmission rate, the techniques require a high signal-to-noise ratio. Hence, the use of the higher order modulation techniques is limited. In the higher order modulation techniques, n encoded bits are mapped onto a certain constellation diagram to produce higher order modulation symbols. Further, the Euclidean distance between adjacent points in a constellation diagram becomes smaller in accordance with an increase in M-ary number of higher order modulation. Therefore, in the higher order modulation techniques, under the condition that the signal-to-noise ratio is the same, the symbol error rate becomes higher for higher order modulation. The symbol error rate for higher order modulation has a relationship with a minimum Euclidean distance in a constellation diagram. On the other hand, the symbol error rate for higher order modulation has no relationship with a mapping relationship between encoded bits in a constellation diagram. However, the encoded bit error rate of a higher order modulation symbol has a strong correlation with the mapping relationship between encoded bits in a constellation diagram. Accordingly, for the encoded bit error rate in a higher order modulation symbol, different encoded bit error rates corresponding to n encoded bits can be obtained by performing mapping differently.

Data traffic requirements for a transmission error rate are very high. For example, a frame error rate is required to be 0.1 percent. Therefore, it is necessary to use channel coding and error correction techniques for achieving such high performance in a poor radio channel environment. At present, a hybrid automatic repeat request (HARQ) technique is generally used. The technique is for detecting and correcting errors by combining an automatic repeat request (ARQ) technique and a forward error correction (FEC) technique. Currently, there are the following three types of hybrid automatic repeat request technique. In the first type, a receiving side discards a packet that cannot be received properly, informs a transmitting side through a return channel to retransmit a copy of the original packet, and independently decodes a newly received packet. In the second type, a receiving side does not discard an error packet and decodes the packet in combination with retransmitted information. In the third type, a receiving side does not discard an error packet and decodes the packet in combination with retransmitted information. In this case, a retransmitted packet includes all essential information to receive data properly.

When a channel error correction is performed using HARQ, first, a transmitting side transmits encoded information to a receiving side. When the receiving side receives the information, the receiving side performs error correction decoding on the received information. If the receiving side properly receives data, the receiving side receives the information and transmits ACK acknowledgement information to the transmitting side. On the other hand, if the receiving side cannot correct an error, the receiving side requests the transmitting side to retransmit data by transmitting NACK information to the transmitting side. Then, the receiving side performs decoding again based on received retransmission data.

FIG. 1 illustrates the configuration of a MIMO+HARQ system of the prior art.

In the above-described configuration, on a transmitting side, transmission data passes through serial/parallel conversion section 101 and is divided into $n_T$ data substreams. Each data substream has a one-to-one correspondence with a transmitting antenna. Before transmission, CRC coding section 102 performs CRC coding on the data substreams. Encoding/modulation section 103 performs encoding and modulation. Then, the modulated data is transmitted through $n_T$ antennas 104. Information fed back by feedback channel 111 indicates a reception state of data. The transmitting side determines whether or not to retransmit the data based on the reception state.

A receiving side receives all signals in a space through $n_R$ receiving antennas 105. Channel estimation section 106 performs channel estimation based on pilot signals included in the received signals or using other methods. Further, channel estimation section 106 estimates current channel characteristic matrix H. In a MIMO system, channel characteristics can be described using a matrix. Finally, MIMO detection section 107 performs detection on each transmission data substream based on channel characteristic matrix H. CRC check section 108 performs a CRC check on the detected data. Feedback information processing section 110 generates feedback information using information depending on whether or not decoding can be performed properly. The receiving side transmits the feedback information to the transmitting side through feedback channel 111. Properly received data passes through parallel/serial conversion section 109 and is ultimately restored to the original data.

DISCLOSURE OF INVENTION

Problems to be Solved by the Invention

However, in the above-described MIMO system of the prior art, data traffic requirements for a transmission error rate are very high, and therefore there is a problem that there is a limitation in improvement of the reliability of system transmission using an HARQ technique and increase in system throughput.

It is therefore an object of the present invention to provide a MIMO transmitting apparatus and a data retransmission method for a MIMO system that make it possible to improve reliability of system transmission using an HARQ technique, increase system throughput, and improve the overall efficiency of data transmission by rearranging retransmission data and newly transmitting data.

Means for Solving the Problem

A MIMO transmitting apparatus of the present invention includes: a retransmission data selecting section that selects retransmission data requiring retransmission based on the received quality at a communicating party; a data rearranging section that rearranges the retransmission data and the newly transmitting data, based on the error rate according to bit positions in one symbol and the number of the retransmission data and the newly transmitting data which are arranged in the bit positions; and a transmitting section that transmits the retransmission data and the newly transmitting data rearranged by the data rearranging section from antennas which are different for each substream.

A data retransmission method for a MIMO system of the present invention includes: a step of selecting retransmission data requiring retransmission based on the received quality at a receiving apparatus; a step of rearranging the retransmission data and the newly transmitting data, based on a comparison result of the number of the retransmission data arranged in bit positions where an error rate is high in one symbol with the number of the newly transmitting data arranged in bit positions where an error rate is low in one symbol, other than the bit positions where the error rate is high in one symbol; a step of transmitting the retransmission data and the newly transmitting data which are rearranged, from the antennas different for each substream at a transmitting apparatus; a step of receiving a plurality of substreams including the retransmission data and the newly transmitting data using a plurality of antennas at the receiving apparatus; a step of reallocating to the data arrangement prior to the rearrangement at the transmitting apparatus by reallocating the received retransmission data and the newly transmitting data; and a step of decoding the retransmission data and the newly transmitting data reallocated to the data arrangement prior to the rearrangement at the transmitting apparatus and acquiring the retransmission data and the newly transmitting data.

Advantageous Effect of the Invention

According to the present invention, by rearranging retransmission data and newly transmitting data, it is possible to improve the reliability of system transmission using a HARQ technique, increase the system throughput, and improve the overall efficiency of the data transmission.

BEST MODE FOR CARRYING OUT THE INVENTION

A preferred embodiment of the present invention will be described below with reference to the drawings.

Embodiment

Figure 1:
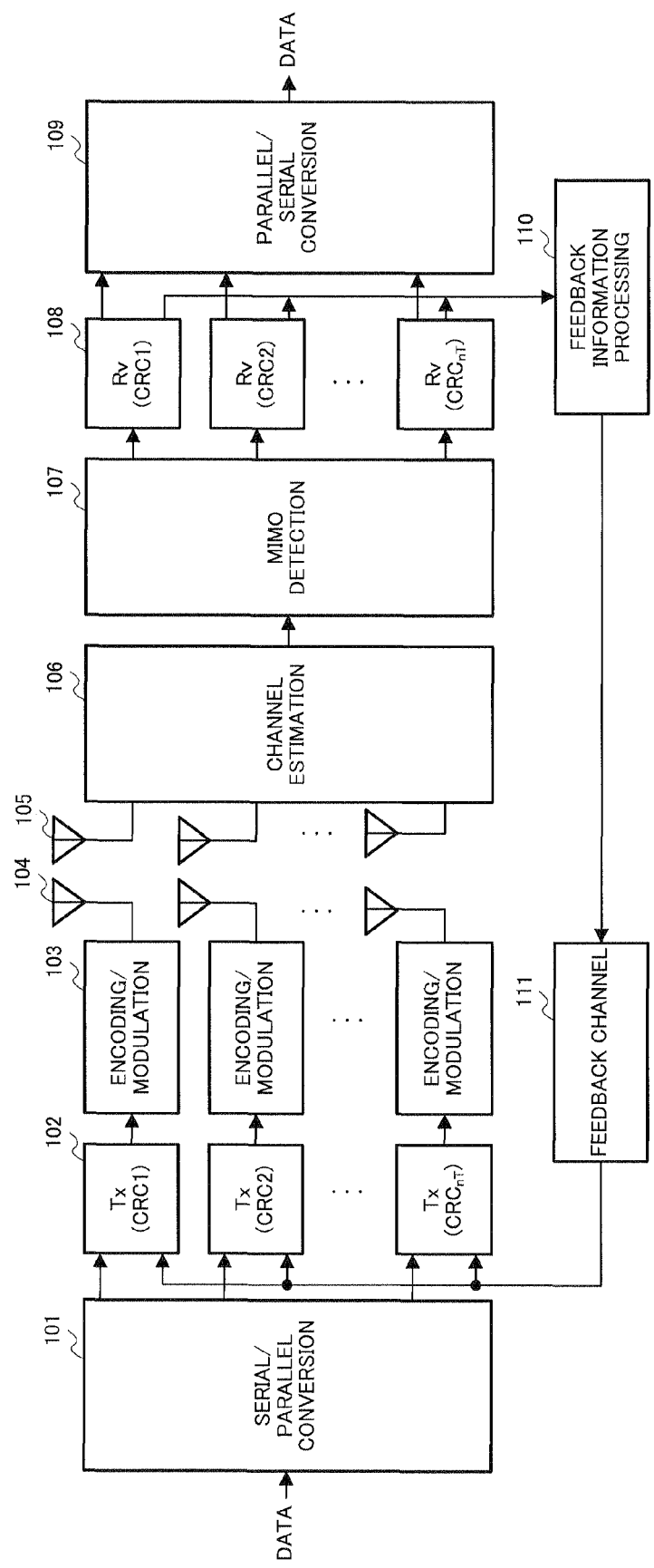
FIG. 1 illustrates the configuration of a MIMO+HARQ system of the prior art.
Figure 2:
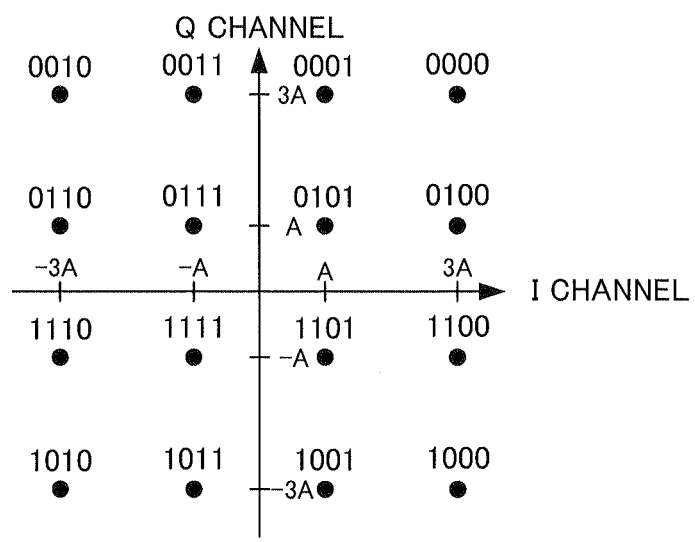
FIG. 2 illustrates a coordinate diagram of a 16QAM constellation using Gray mapping.

FIG. 2 illustrates a coordinate diagram of a 16QAM constellation using Gray mapping.

In FIG. 2, the Gray mapping guarantees that only one encoded bit is different among four encoded bits (S3 S2 S1 S0) at two adjacent points in the constellation. Accordingly, the Gray mapping can minimize the error rate of encoded bits. In four encoded bits (S3 S2 S1 S0), the encoded bit error rates of S3 and S1 are lower than the encoded bit error rates of S2 and S0. That is, the signal-to-noise ratio of the encoded bits S3 and S1 is higher than the signal-to-noise ratio of the encoded bits S2 and S0. To improve data transmission error performance upon retransmission, in the present invention, retransmission data bits are allocated to positions where the encoded bit error rate is low. Here, four encoded bits (S3 S2 S1 S0) form one symbol.

Figure 3:
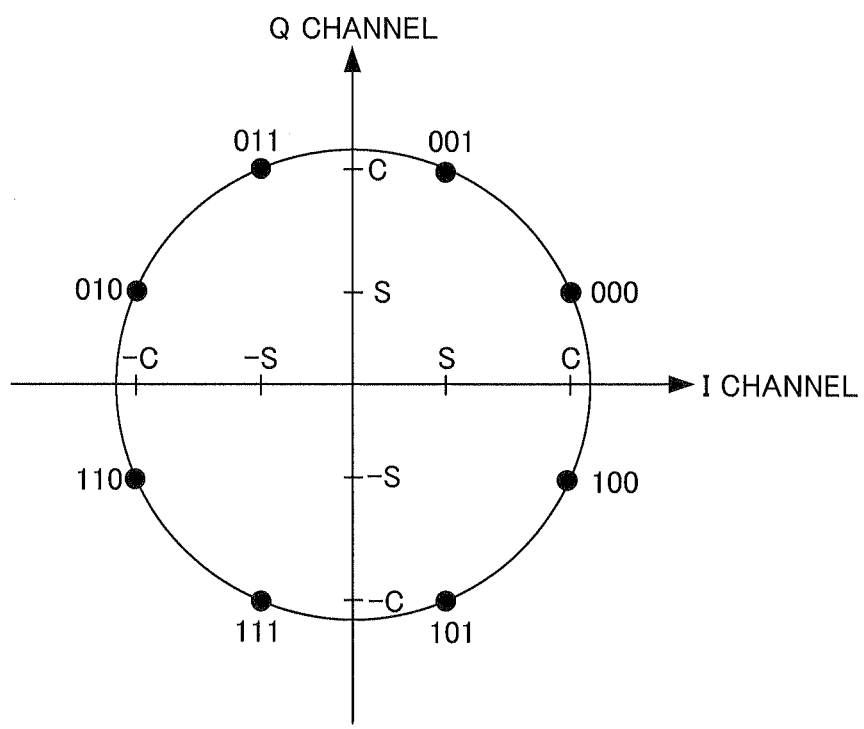
FIG. 3 illustrates a coordinate diagram of an 8PSK constellation using Gray mapping.

FIG. 3 illustrates a coordinate diagram of an 8PSK constellation using Gray mapping.

In three encoded bits (S2 S1 S0) of an 8PSK symbol, the encoded bit error rates of S2 and S1 are lower than the encoded bit error rates of S0. That is, the signal-to-noise ratio of encoded bits S2 and S1 is higher than the signal-to-noise ratio of encoded bit S1. Here, three encoded bits (S2 S1 S0) form one symbol.

In a normal MIMO system, if there is an error in data, a transmitting side performs encoding and modulation again on the error data and transmits the data from antennas.

In the present invention, the transmitting side has a data interleaving section for performing interleaving that is processing of rearranging data between an encoding section and a modulation section. After the transmitting side interleaves encoded data using the data interleaving section, the transmitting side performs symbol mapping using a demodulation section. Furthermore, the transmitting side ultimately modulates the data and allocates the modulated data to a plurality of antennas and then performs data transmission.

If the receiving side cannot properly receive data, the transmitting side retransmits the data. Upon retransmission of the data, the transmitting side interleaves retransmission data substreams and newly transmitting data substreams based on a used modulation scheme. The interleaved data reserves bit positions such that the data is mapped in positions where the bit error performance is good in the process of modulating retransmission data bits. Modulated data is allocated to a plurality of antennas and transmitted.

When the receiving side receives data, the receiving side first performs channel estimation and MIMO detection. The receiving side demodulates the data and deinterleaves the demodulated data. Furthermore, the receiving side restores the data to the original data substreams and performs decoding.

Figure 4A:
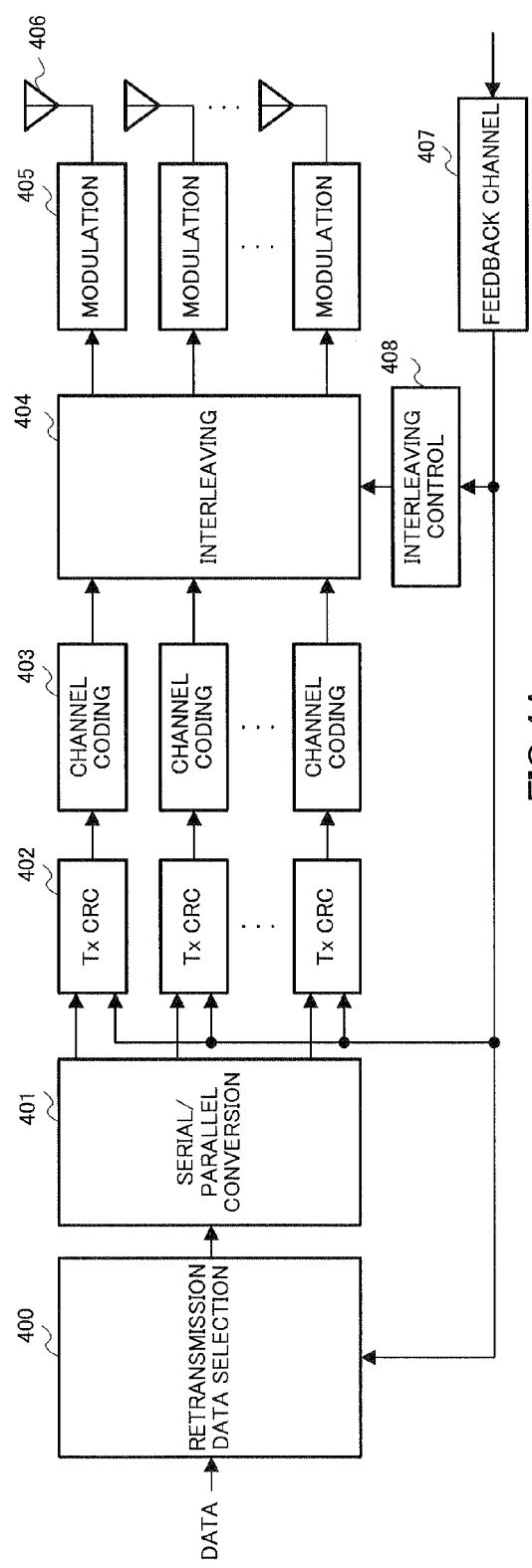
FIG. 4A illustrates the configuration of a MIMO system on a transmitting side according to an embodiment of the present invention.

FIG. 4A illustrates the configuration of a MIMO system on a transmitting side according to the embodiment of the present invention.

As shown in FIG. 4A, the transmission side has: retransmission data selecting section 400; serial/parallel conversion section 401; CRC coding section 402; channel encoding section 403; interleaving section 404; modulation section 405; antennas 406; feedback channel 407; and interleaving control section 408. In FIG. 4A, data is temporarily stored by retransmission data selecting section 400. If it is determined that the data needs to be retransmitted based on fed back information, the data is outputted from retransmission data selecting section 400 as retransmission data. The data outputted from retransmission data selecting section 400 is serial/parallel converted by serial/parallel conversion section 401. Further, the serial/parallel-converted data is CRC encoded by CRC coding section 402. Further, the CRC-encoded data is channel encoded by channel encoding section 403. The channel-encoded data is interleaved by interleaving section 404 under the control of interleaving control section 408. Interleaving control section 408 controls interleaving based on information fed back from feedback channel 407. Interleaving section 404 and interleaving control section 408 configure a data rearranging section.

If there is no retransmission data, data passes through encoding section 403 and is modulated by modulation section 405 without being subjected to data interleaving.

If data retransmission is required, it is assumed that the number of bits of retransmission data which are encoded and arranged in bit positions where the encoded bit error rate is high is N (the number of bits that require substitution) and the number of bits of newly transmitting data which are arranged in bit positions where the encoded bit error rate is low is M (the number of substitutable bits). Here, there are two types of state, that is, N≦M and N>M.

First, the case of N≦M will be described. When N≦M, the transmitting side substitutes the bit positions of M bits of newly transmitting data arranged in bit positions where the encoded bit error rate is low for the bit positions of N bits of retransmission data arranged in bit positions where the encoded bit error rate is high. For example, it is assumed that when there are four transmitting antennas, that is, four data substreams, one of the data substreams is not properly decoded and thereby requires retransmission. When a 16QAM modulation scheme with Gray mapping is used for modulation and four encoded bits of a symbol are (S3 S2 S1 S0), the signal-to-noise ratio of the encoded bits S3 and S1 is higher than the signal-to-noise ratio of the encoded bits S2 and S0. Therefore, the transmitting side needs to map retransmission data bits in the positions of S3 and S1. When the number of bits after encoding one data substream is 2N, the number of bit data in positions where the encoded bit error rate is high is N. After other data substreams are encoded, the number of bits in positions where the encoded bit error rate is low is 3N in total. In this case, the number of bits requiring substitution is N in total, and thereby the transmitting side averagely allocates the N bits to the other three data substreams. Upon allocation, in the first data substream, ⌈(N/3)⌉ bits are substituted (symbols ⌈ ⌉ represent upper clipping). In the second data substream, ⌊(N/3)⌋ bits are substituted (symbols ⌊ ⌋ represent lower clipping). In the third data substream, (N−⌈(N/3)⌉−⌊(N/3⌋) bits are substituted. In the first data substream, the number of bit data in positions where the encoded bit error rate is low is N. The transmitting side averagely selects ⌊(N/3)⌋ bits of the N bits and substitutes the selected bits for the retransmission data bits. For example, the transmitting side selects one bit every two bits of these bits and substitutes the selected bits for the retransmission data bits. Here, the upper clipping indicates that a minimum value is obtained from integers greater than a parameter value. The lower clipping indicates that a maximum value is obtained from integers smaller than a parameter value. For example, in the case of the upper clipping, ⌈(3.3)⌉=4 and ⌈(6.9)⌉=7. In the case of the lower clipping, ⌊(3.3)⌋=3 and ⌊(6.9)⌋=6.

When an 8PSK modulation scheme with Gray mapping is used for modulation, three encoded bits of a symbol are (S2 S1 S0). In this case, the transmitting side needs to map retransmission data bits in the positions of S2 and S1. This is because the signal-to-noise ratio of encoded bits S2 and S1 that is higher than that of encoded bit S0.

Next, the case of N>M will be described. When N>M, there is a lot of error data and thereby the transmitting side uses antennas different from the antennas used for the last transmission upon retransmission. Upon selecting antennas, the transmitting side may select antennas with a high SINR value based on a SINR value of each data substream fed back from the receiving side. Alternatively, the transmitting side may randomly select transmitting antennas different from the antennas used last time. The transmitting side performs positional substitution of encoded bits of retransmission data substreams, that is, substitutes positions of newly transmitting data bits in bit positions where the encoded bit error rate is low in a constellation diagram for retransmission data bits in positions where the encoded bit error rate is high in the constellation diagram. Further, the transmitting side averages the signal-to-noise ratios of transmission bits of the transmission substreams. By doing so, the accuracy of information reception can be improved. When the number of bits of retransmission data K in bit positions where the signal-to-noise ratio of encoded bits among retransmitting data substreams is low is equal to or smaller than the number of newly transmitting data bits L in positions where the signal-to-noise ratio of encoded bits is high, the transmitting side uniformly substitutes positions of the newly transmitting data bits in the bit positions where the signal-to-noise ratio of encoded bits is high for the retransmission data bits in the bit positions where the signal-to-noise ratio of encoded bits is low. Otherwise, that is, when K>L, the transmitting side uniformly selects L bits of the retransmission data bits in the bit positions where the signal-to-noise ratio of encoded bits is low. The transmitting side substitutes positions of the selected L bits for the newly transmitting data bits in the bit positions where the signal-to-noise ratio of encoded bits is high.

Putting it all together, specific substitution includes the following steps.

In Step 1, the transmitting side calculates the number of bits N requiring substitution in retransmission data substreams. The transmitting side compares the calculated number of bits N with the number of substitutable data bits M in newly transmitting data substreams. N represents the number of bits in the retransmission data arranged in bit positions where the encoded bit error rate is high. Further, M represents the total number of bits in the newly transmitting data arranged in bit positions where the encoded bit error rate is low. If N≦M, the transmitting side executes Step 2. On the other hand, if N is not equal to or less than M, the transmitting side executes Step 3.

In Step 2, the transmitting side substitutes the positions of data bits of other data substreams for the data bits requiring substitution in the retransmission data substreams. When the number of the newly transmitting data substreams is k, the number of data bits requiring substitution in the first data substream is $\lceil(N/k)\rceil$. Further, the number of the data bits requiring substitution in the second data substream is $\lfloor(N/k)\rfloor$. Further, the number of the data bits requiring substitution in the third and fourth data substreams are $\lceil(N/k)\rceil$ and $\lfloor(N/k)\rfloor$, respectively. Further, the number of the data bits requiring substitution in the last k-th data substream is $(N-11\lceil(N/k)\rceil-12\lfloor(N/k)\rfloor)$. Here, 11 represents the number of the data substreams in which $\lceil(N/k)\rceil$ bits are substituted. Further, 12 represents the number of data substreams in which $\lfloor(N/k)\rfloor$ bits are substituted. After substitution, part of bits of the retransmission data is averagely allocated to the newly transmitting data substreams. Further, part of bits of the newly transmitting data substreams is allocated to the retransmission data substreams. The transmitting side moves to the processing of Step 4 from the processing of Step 2.

In Step 3, the transmitting side allocates retransmission data to antennas that are different from the antennas used for the first transmission, that is, different data substreams. The transmitting side performs substitution of bit positions of encoded bits of the retransmission data substreams. That is, the transmitting side substitutes positions of the bits in bit positions where the encoded bit error rate is low in a constellation diagram for bits arranged in bit positions where the encoded bit error rate is high in the constellation diagram. The transmitting side averages the signal-to-noise ratios of the encoded bits of the retransmission data substreams. By doing so, the accuracy of information reception improves.

In Step 4, the transmitting side ends an interleave process.

After data is interleaved, modulation section 405 modulates the data. The modulated data is transmitted from transmitting antennas 406.

Figure 4B:
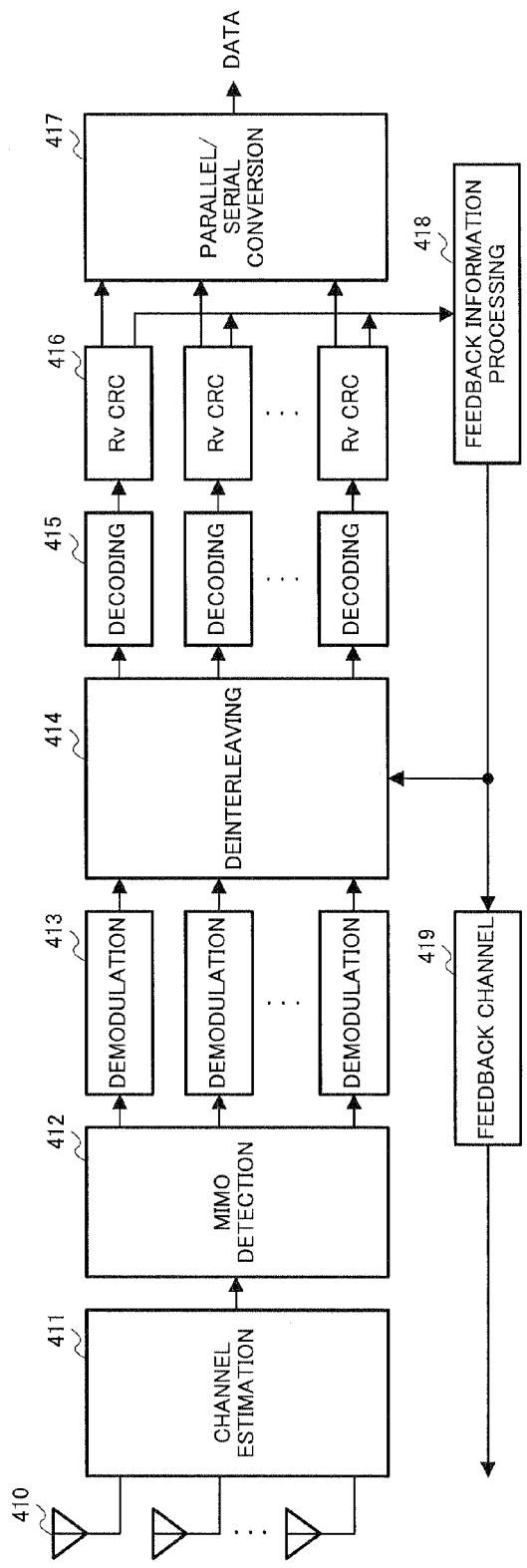
FIG. 4B illustrates the configuration of the MIMO system on a receiving side according to the embodiment of the present invention.

FIG. 4B illustrates the configuration of the MIMO system on a receiving side according to the embodiment of the present invention.

As shown in FIG. 4B, the receiving side has: a plurality of receiving antennas 410; channel estimation section 411; MIMO detection section 412; demodulation section 413; deinterleaving section 414 (data re-arranging section); decoding section 415; CRC check section 416; parallel/serial conversion section 417; feedback information processing section 418; and feedback channel 419. On the receiving side, a plurality of receiving antennas 410 receive data. Further, channel estimation section 411 performs channel estimation based on pilot signals of the received signals or using other methods. Further, channel estimation section 411 estimates current channel characteristic matrix H. MIMO detection section 412 performs data detection on each transmission data substream based on channel characteristic matrix H. Further, demodulation section 413 demodulates the detected data. Deinterleaving section 414 performs a deinterleaving operation using feedback information. If there is no retransmission data, the deinterleaving section does not perform a deinterleaving process. After the data is deinterleaved, the data is restored to the original data substream. Further, decoding section 415 performs decoding. Further, CRC check section 416 performs a CRC check. Information as to whether or not data is properly received is processed by feedback information processing section 418. Feedback information processing section 418 generates feedback information. The receiving side feeds back the generated feedback information to the transmitting side using feedback channel 419. Further, data that is properly decoded is parallel/serial converted by parallel/serial conversion section 417. By doing so, the receiving side obtains original transmission data.

Figures 5A, 5B:
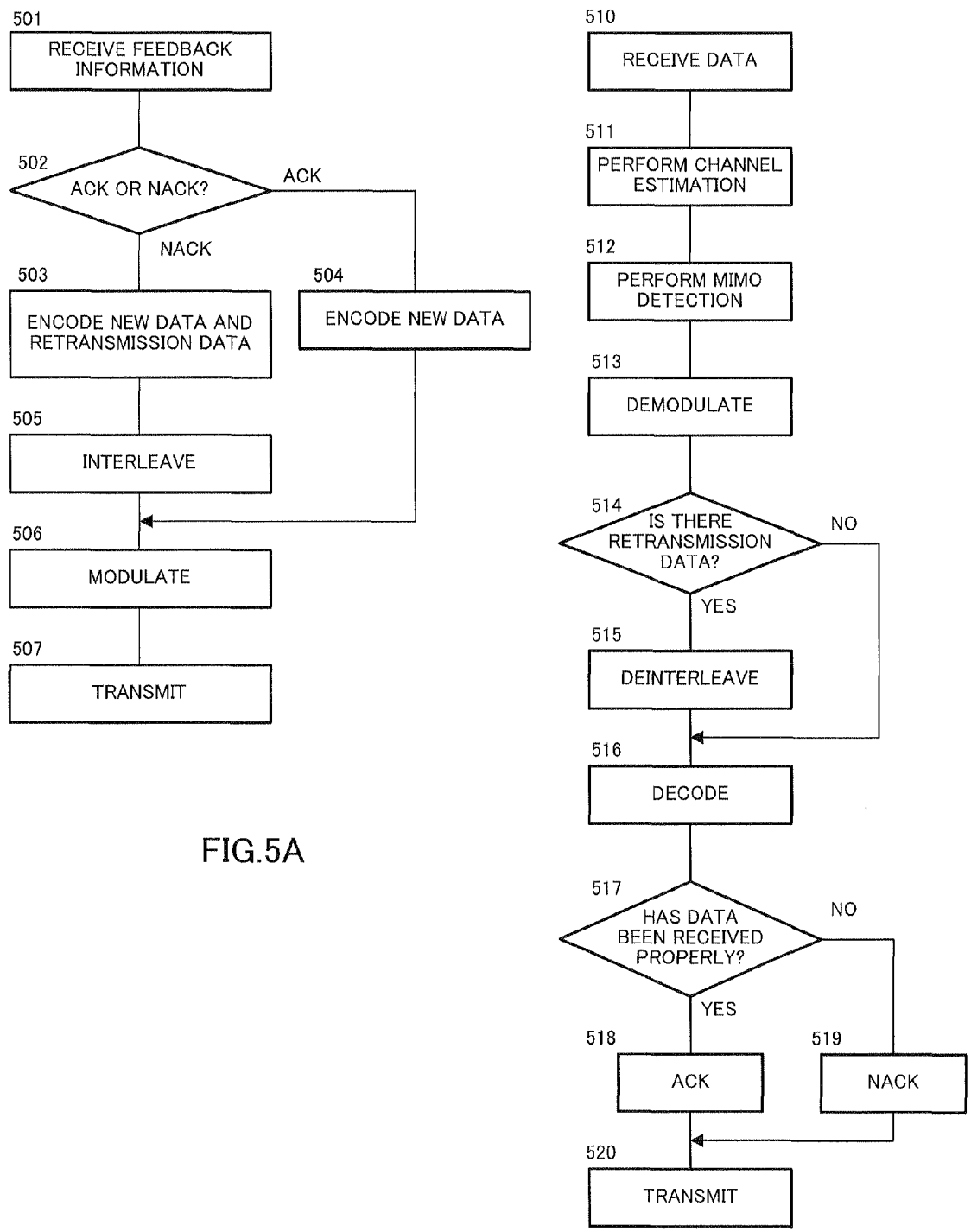
FIG. 5A is a flowchart illustrating transmission processing on the transmitting side and the receiving side according to the embodiment of the present invention.
FIG. 5B is a flowchart illustrating the transmission processing on the transmitting side and the receiving side according to the embodiment of the present invention.

FIGS. 5A and 5B are flowcharts illustrating transmission processing on the transmitting side and the receiving side according to the embodiment of the present invention.

The transmitting side receives information fed back from the receiving side (step 501). The transmitting side determines whether the feedback information is positive acknowledgement (ACK) or negative acknowledgement (NACK) (step 502). If data is properly received, the transmitting side transmits new data. The transmitting side encodes new data substreams (step 504). The transmitting side directly modulates the encoded new data substreams (step 506). The transmitting side transmits the modulated new data substreams (step 507). If data retransmission is required, the transmitting side encodes retransmission data and newly transmitting data (step 503). The transmitting side interleaves the encoded retransmission data bits and newly transmitting data bits by a certain scheme (step 505). The transmitting side modulates the interleaved retransmission data bits and newly transmitting data bits (step 506). The transmitting side maps the modulated retransmission data bits and newly transmitting data bits onto symbols. The transmitting side allocates the modulated retransmission data bits and the newly transmitting data bits to different antennas and transmits the data bits (step 507).

The receiving side receives the data transmitted from the transmitting side (step 510) The receiving side performs channel estimation (step 511). Further, the receiving side estimates current channel characteristic matrix H. The receiving side then performs data detection on each transmission data substream based on channel characteristic matrix H (step 512). The receiving side demodulates the detected data (step 513). The receiving side restores symbols into data bits. If the retransmission data is not included (step 514), the receiving side directly performs decoding (step 516). On the other hand, if the retransmission data is included, the receiving side performs deinterleaving (step 515). The receiving side restores the data to the original data substreams and performs decoding on the data (step 516). If the data is properly received (step 517), the receiving side generates ACK which is positive acknowledgement information (step 518). On the other hand, if the data is not properly received, the receiving side generates NACK which is negative acknowledgement information (step 519). The receiving side transmits feedback information (step 520).

Figure 6:
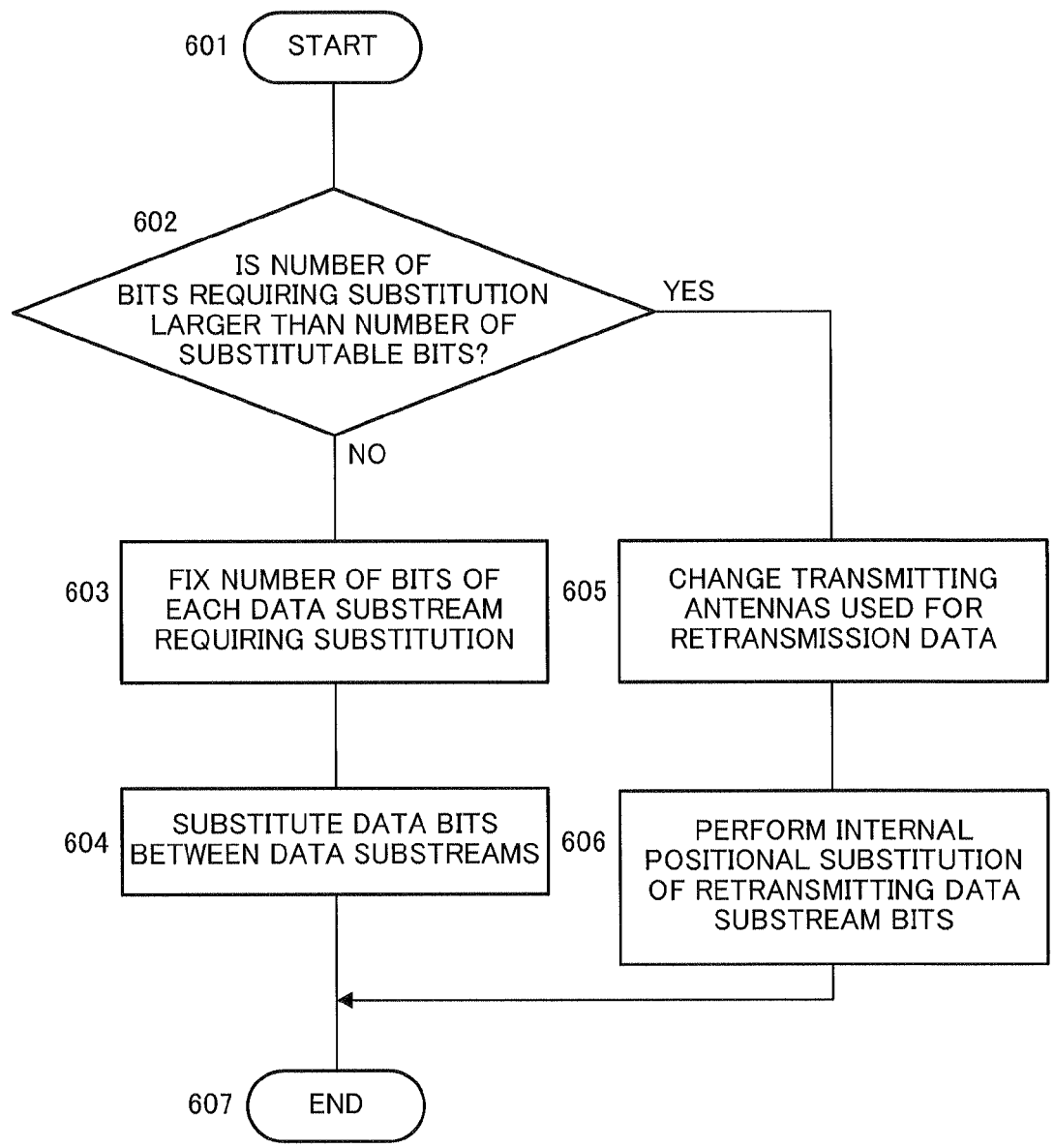
FIG. 6 is a flowchart illustrating interleave processing according to the embodiment of the present invention.

FIG. 6 is a flowchart illustrating interleaving processing according to the embodiment of the present invention.

In FIG. 6, if there is retransmission data, the transmitting side needs to interleave transmission data after encoding. When an interleaving process starts (step 601), the transmitting side first compares the number of bits N requiring substitution and the number of substitutable bits M (step 602). Here, the number of the bits requiring substitution refers to the number of bits in bit positions where the encoded bit error rate in retransmission data is high. Further, the number of the substitutable bits refers to the total number of bits in bit positions where the encoded bit error rate in newly transmitting data is low. If N≦M, the transmitting side fixes the number of bits requiring substitution in data substreams (step 603). When the number of the newly transmitting data substreams is k, the number of bits requiring substitution in the first data substream is $\lceil(N/k)\rceil$. Further, the number of bits requiring substitution in the second data substream is $\lfloor(N/k)\rfloor$.

Further, the numbers of bits requiring substitution in the third and fourth data substreams are $\lceil (N/k) \rceil$ and $\lfloor (N/k) \rfloor$, respectively.

Further, the number of bits requiring substitution in the last k-th data substream is $(N-11\lceil (N/k) \rceil - 12 \lfloor (N/k) \rfloor)$. Here, 11 represents the number of data substreams in which $\lceil (N/k) \rceil$ bits are substituted. Further, 12 represents the number of data substreams in which $\lfloor (N/k) \rfloor$ bits are substituted. When the transmitting side fixes the number of bits requiring substitution in data substreams, the transmitting side uniformly substitutes data bits of the new data substreams for retransmission data bits requiring substitution (step 604). If N>M, the transmitting side first changes transmitting antennas used for retransmission data substreams (step 605). Upon changing transmitting antennas, the transmitting side may select antennas with a high SINR value based on the SINR value of data substreams fed back from the receiving side. Alternatively, the transmitting side may randomly select transmitting antennas that are different from the antennas used for the last transmission. The transmitting side substitutes positions of bits of the retransmission data substreams (step 606), that is, substitutes positions of the newly transmitting data bits arranged in bit positions where the encoded bit error rate is low in a constellation diagram for the retransmission data bits arranged in bit positions where the encoded bit error rate is high in the constellation diagram. Further, the transmitting side averages the signal-to-noise ratios of transmitting bits of all transmission substreams. By doing so, the accuracy of information reception improves. Thereafter, the transmitting side ends the whole interleaving process (step 607).

As described above, the present invention is described using preferred embodiments. However, it is obvious to those skilled in the art that the present invention can be implemented by making various modifications, substitutions, and addition within the spirit and scope of the present invention.

INDUSTRIAL APPLICABILITY

A MIMO transmitting apparatus and a data retransmission method in a MIMO system according to the present invention are suitable for retransmitting data in a MIMO system.

The invention claimed is:

1. A MIMO transmitting apparatus comprising:
a retransmission data selecting section that selects retransmission data requiring retransmission, based on a received quality at a communicating party;
a data rearranging section that rearranges the retransmission data and new data that is to be transmitted which is separate from the retransmission data, based on an error rate according to each bit position in one symbol and on a number of bits of the retransmission data and the new data which are arranged in the bit positions; and
a transmitting section that simultaneously transmits the retransmission data and the new data rearranged by the data rearranging section from antennas which are different for each substream, wherein, when the number of bits of the retransmission data arranged in a first bit position of a higher error rate in the one symbol is equal to or smaller than the number of bits of the new data arranged in a second bit position of a lower error rate in the one symbol, the second bit position being other than the first bit position of the higher error rate, the data rearranging section performs the rearrangement between the substreams so that the retransmission data arranged in the first bit position of the higher error rate and the new data arranged in the second bit position of the lower error rate are exchanged.

2. A MIMO transmitting apparatus comprising:
a retransmission data selecting section that selects retransmission data requiring retransmission, based on a received quality at a communicating party;
a data rearranging section that rearranges the retransmission data and new data that is to be transmitted which is separate from the retransmission data, based on an error rate according to each bit position in one symbol and on a number of bits of the retransmission data and the new data which are arranged in the bit positions; and
a transmitting section that simultaneously transmits the retransmission data and the new data rearranged by the data rearranging section from antennas which are different for each substream,
wherein, when the number of bits of the retransmission data arranged in a first bit position of a higher error rate in the one symbol is larger than the number of bits of the new data arranged in a second bit position of a lower error rate in the one symbol, the second bit position being other than the first bit position of the higher error rate, the data rearranging section selects a same number of bits of the retransmission data arranged in the first bit position of the higher error rate as the number of bits of the new data arranged in the second bit position of the lower error rate and performs the rearrangement per substream including the selected retransmission data.

3. The MIMO transmitting apparatus according to claim 2, wherein the data rearranging section performs the rearrangement so that the retransmission data is transmitted from first antennas that are different from second antennas used for an immediately preceding transmission.

4. The MIMO transmitting apparatus according to claim 3, wherein the data rearranging section performs the rearrangement so that the retransmission data is transmitted from the first antennas having a received quality that is equal to or greater than a predetermined value.

5. The MIMO transmitting apparatus according to claim 3, wherein the data rearranging section performs the rearrangement so that the retransmission data is transmitted from the first antennas that are arbitrarily selected.

6. A data retransmission method for a multiple-input multiple-output (MIMO) system, the method comprising
selecting retransmission data requiring retransmission, based on a received quality at a communicating party;
rearranging the retransmission data and new data that is to be transmitted which is separate from the retransmission data, based on an error rate according to each bit position in one symbol and on a number of bits of the retransmission data and the new data which are arranged in the bit positions; and
simultaneously transmitting the retransmission data and the new data rearranged by the data rearranging section from antennas which are different for each substream,
wherein, when the number of bits of the retransmission data arranged in a first bit position of a higher error rate in the one symbol is equal to or smaller than the number of bits of the new data arranged in a second bit position of a lower error rate in the one symbol, the second bit position being other than the first bit position of the higher error rate, performing the rearrangement between the substreams so that the retransmission data arranged in the first bit position of the higher error rate and the new data arranged in the second bit position of the lower error rate are exchanged.

7. A data retransmission method for a multiple-input multiple-output (MIMO) system, the method comprising:

selecting retransmission data requiring retransmission, based on a received quality at a communicating party;

rearranging the retransmission data and new data that is to be transmitted which is separate from the retransmission data, based on an error rate according to each bit position in one symbol and on a number of bits of the retransmission data and the new data which are arranged in the bit positions; and simultaneously transmitting the retransmission data and the new data rearranged by the data rearranging section from antennas which are different for each substream, wherein, when the number of bits of the retransmission data arranged in a first bit position of a higher error rate in the one symbol is larger than the number of bits of the new data arranged in a second bit position of a lower error rate in the one symbol, the second bit position being other than the first bit position of the higher error rate, selecting a same number of bits of the retransmission data arranged in the first bit position of the higher error rate as the number of bits of the new data arranged in the second bit position of the lower error rate and performs the rearrangement per substream including the selected retransmission data.

* * * * *